United States Patent [19]

Nakano

[11] Patent Number: 5,305,069
[45] Date of Patent: Apr. 19, 1994

[54] TWO COLOR IMAGE FORMING APPARATUS

[75] Inventor: Masao Nakano, Kamakura, Japan

[73] Assignee: Canon Kabushiki Kaisha, Tokyo, Japan

[21] Appl. No.: 53,677

[22] Filed: Apr. 29, 1993

[30] Foreign Application Priority Data

Apr. 30, 1992 [JP] Japan .................. 4-139770

[51] Int. Cl.$^5$ .......................................... G03G 15/01
[52] U.S. Cl. ............................... 355/326 R; 346/108; 346/160; 355/208; 355/328
[58] Field of Search ............ 355/326 R, 327, 328, 355/203, 208, 228, 229, 268; 430/100; 346/153.1, 160, 108

[56] References Cited

U.S. PATENT DOCUMENTS

| | | | |
|---|---|---|---|
| 4,879,576 | 11/1989 | Naito | 355/228 X |
| 4,958,189 | 9/1990 | Yoshida | 355/208 |
| 4,984,021 | 1/1991 | Williams | 355/328 X |
| 4,998,118 | 3/1991 | Ng | 355/160 X |
| 5,153,609 | 10/1992 | Ando et al. | 346/108 |
| 5,255,062 | 10/1993 | Oka et al. | 355/326 |

Primary Examiner—A. T. Grimley
Assistant Examiner—Sandra L. Brasé
Attorney, Agent, or Firm—Fitzpatrick, Cella, Harper & Scinto

[57] ABSTRACT

An image forming apparatus includes an electrophotographic photosensitive member; charging device for electrically charging the photosensitive member; one information light source for emitting light information to the photosensitive member, the light source being actuatable by electric power supply; light quantity control device for controlling the light source to produce a controlled quantity of light from the light source in accordance with image information; developing device for developing an electrostatic latent image formed on the photosensitive member, the developing device comprises first developing device for developing it with first toner, and second developing device for developing it with second toner having a color different from that of the first toner; wherein the control device comprises a reference current source for supplying a predetermined reference current, and a color current source for supplying currents predetermined for respective colors, and wherein in exposure for a pixel, the light source is supplied with a current which is a sum of a current from the reference current source and a current from the color current source, so that an electrostatic latent image having different potentials in accordance with colors of the image information is formed by a single image information exposure step.

6 Claims, 15 Drawing Sheets

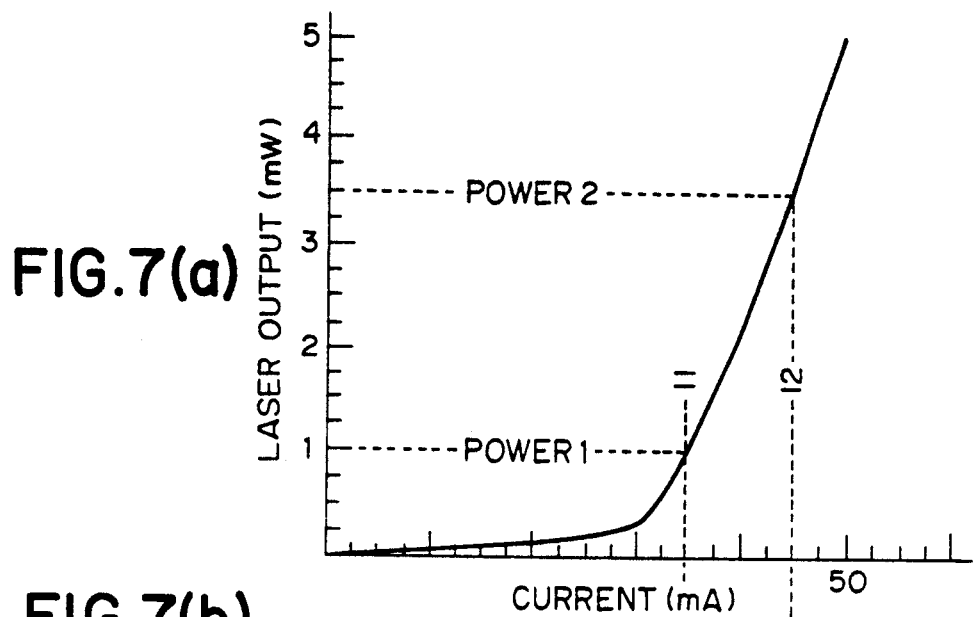
FIG.7(a)
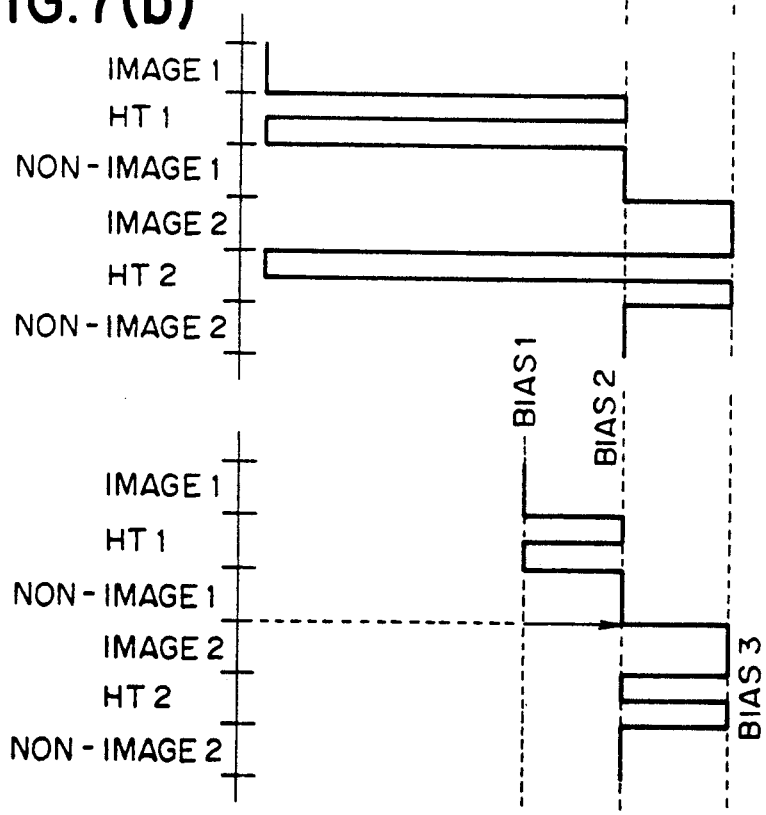
FIG.7(b)
FIG.7(c)

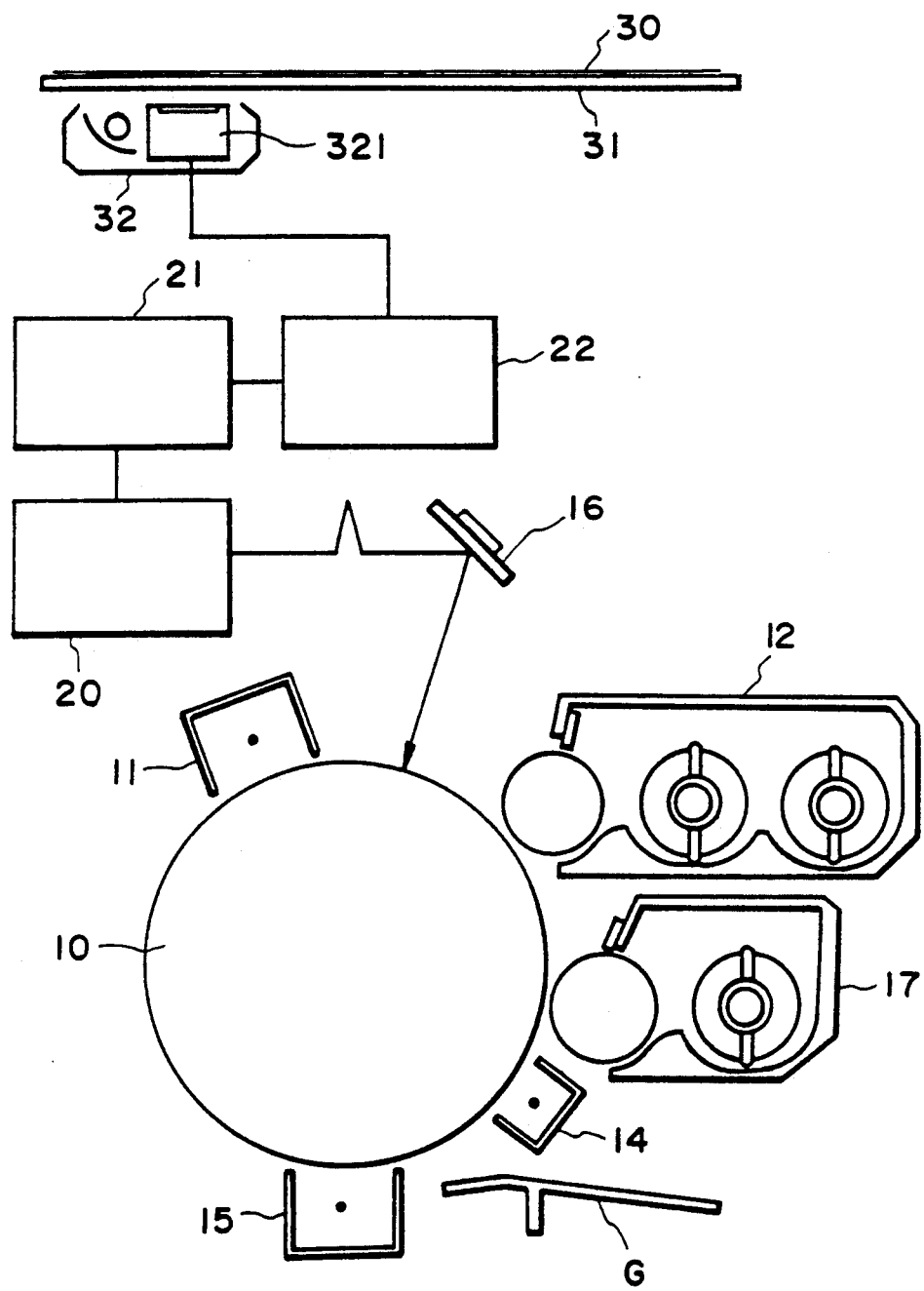
F I G. 9

TWO COLOR IMAGE FORMING APPARATUS

FIELD OF THE INVENTION AND RELATED ART

The present invention relates to an image forming apparatus capable of forming two color images through an electrophotographic process.

Various color image forming apparatuses have been proposed. In such an image forming apparatus, an electrostatic latent image is formed on a surface of a photosensitive drum (image bearing member) by a latent image forming means, and the image is visualized by black or red toner.

Referring first to FIGS. 11-13, a first conventional example will be described in which latent image forming means are provided for the respective colors.

FIG. 11 is a longitudinal sectional view of an image forming apparatus. The photosensitive drum 10 shown in the Figure is rotatably supported on the main assembly of the apparatus, and is rotated in a clockwise direction by an unshown driving means. Around the photosensitive drum 10, there are provided a primary charger 11 in the form of a corona discharger or the like for uniformly charging the surface of the photosensitive drum 10, developing devices 52 and 53 for visualizing with respective color toners an electrostatic latent image formed on the photosensitive drum 10 (which will be described hereinafter), a charging device 14 for adjusting the charge polarity of the toner image prior to the image transfer, an image transfer device 15 for transferring the respective color toner images onto a transfer material (not shown) conveyed on a guiding member G, in the order named. The developing device (first developing means) 52 is of a regular development type, and the other developing device (second developing means) 53 is of a reverse development type.

Above the photosensitive drum 10, there are disposed two exposure light sources 50 and 51. The light sources 50 and 51 are effective to project laser beams corresponding to the respective colors onto the photosensitive drum 10, so that electrostatic latent images are formed. The portion irradiated with the laser beam from the first light source 50 is downstream of the primary charger 11, as shown in the Figure, and the portion irradiated with the laser beam from the second source 51 is downstream of the developing device 52.

The electrostatic latent image formation process using the light sources 50 and 51, will be described on the basis of the sensitivity property of the photosensitive drum shown in FIG. 12. In FIG. 12, the abscissa represents an exposure amount of the laser beam, and the ordinate represents the surface potential of the photosensitive drum, and the electric discharge of the photosensitive drum is larger if the amount of exposure is larger, so that the surface potential of the photosensitive drum is lower.

First, the first light source 50 projects the beam with exposure amount corresponding to Power 1 onto all the pixels other than the pixels to receive the first color toner. Therefore, the potential of the unexposed pixels is maintained at the charged potential V1 (1000 V), and the potential of the exposed pixels decreases to V0 (500 V).

Subsequently, the second light source means 51 projects the deem with Power 2 only onto the pixels to receive the second color toner. However, the potential of the exposed pixels decreases to V2 (100 V). The exposure amount of the second light source 51 is larger than the exposure amount of the first light source means 50.

In this manner, an electrostatic latent image is formed on the photosensitive drum by three potentials (V0, V1 and V2). Referring to FIG. 13, the description will be made as to image forming process using the image forming apparatus described above. FIG. 13 shows the change of the surface state of the photosensitive drum 10 (the surface potential and the toner deposition state) with elapse of time. The ordinate represents the surface potential of the photosensitive drum, and the abscissa represents a position on the photosensitive drum. The arrow in the Figure indicates the light irradiation, and the patterns designate the toner deposition.

When a predetermined signal is produced, the photosensitive drum 10 is rotated in the clockwise direction, and the primary charger 11 starts to charge the surface of the photosensitive drum 10 to 1000 V (V1), as shown by (a) in FIG. 13. Then, the first light source 53 projects the light to the surface of the photosensitive drum 10 charged by the primary charger 11, thus discharging the portions (pixels) not to receive the first color toner down to 500 V (V0), so that the electrostatic latent image of the first color is formed (FIG. 13, (b)). At this time, the background area level (500 V) for the second color is also provided. When the electrostatic latent image is faced to the developing device 52 as a result of rotation of the photosensitive drum 10, the electrostatic latent image is developed through a regular development process, so that the toner is deposited to the portion not exposed and therefore for discharged (high potential portion) (FIG. 13, (c)). Thus, the first color toner image is formed on the photosensitive drum 10.

With the further rotation of the photosensitive drum 10, the second light source 51 projects the laser beam to partly discharge down to 100 V (V2), so that a second color electrostatic latent image is formed (FIG. 13, (d)). When the electrostatic latent image is faced to the developing device 53 as a result of the rotation of the photosensitive drum 10, the electrostatic latent image is developed through a reverse development process, so that the portion exposed and discharged to 100 V (low potential portion) receive the toner. Thus, two color toner images are formed on the photosensitive drum 10 (FIG. 13, (e)).

The surface of the photosensitive drum 10 having such toner images is re-charged by the charging device 14, so that the charge property of the toner image is adjusted. The transfer material (not shown) conveyed on the guiding member G is supplied to between the photosensitive drum 10 and the transfer device 15 by an unshown feeding means in synchronism with the rotation of the photosensitive drum 10, and the two toner images are simultaneously transferred from the photosensitive drum 10 onto the transfer material (not shown).

This first prior art example requires a plurality of light source means, thus requiring a larger space about the photosensitive drum. Since the image exposures for the different colors are carried out at different times, and therefore, the exposure control is complicated in order to synchronize the two color images. Memory means is required for temporarily storing the image which will be written at a later stage. This also complicates the apparatus. Furthermore, the misalignment between different color images easily occurs.

For the purpose of providing a solution to these problems, an apparatus has been proposed which has only one latent image forming means.

Referring to FIGS. 14 and 15, such an example will be described as a second conventional example.

FIG. 14 is a longitudinal sectional view of another type image forming apparatus capable of two color image. The same reference numerals as in FIG. 11 have been assigned to the elements having the corresponding functions, and the detailed description thereof is omitted. In this example, only one light source means 56 is used to simultaneously form electrostatic latent images for two colors. The charge potential by the primary charger 11 is 1000 V, and the electrostatic latent image for the first color is provided by discharging the potential to 500 V, and the electrostatic latent image for the second color is provided by discharging the potential to 100 V.

Referring to FIG. 15, the image forming process in the above-described image forming apparatus will be described. Similarly to FIG. 13, FIG. 15 shows the surface state change of the photosensitive drum 10 with time.

When a predetermined signal is generated, the photosensitive drum 10 is rotated, and the primary charger 11 starts to charge the surface of the photosensitive drum 10 to 1000 V (FIG. 15, (a)). Since only one light source is used in this example, the exposure amount is changed for respective pixels. More particularly, one of the following three conditions is selected:

(1) Non-exposure is effected by the light source means 56, and the surface potential of the photosensitive drum 10 is maintained at the originally charged potential V1 (1000 V):

(2) The potential is decreased from the charged potential V1 (1000 V) to V0 (500 V) by exposure (Power 1) by the light source means 56: and (3) The potential is decreased from the charged potential V1 (1000 V) to V2 (100 V) by the exposure (Power 2) by the light source means 56. By doing so, the potential differences are provided, thus forming the electrostatic latent image (FIG. 15, (b)).

When the electrostatic latent image is are faced to the developing device 52 as a result of the rotation of the photosensitive drum 10, the developing operation of the regular development type is carried out by the developing device 52, so that the toner is deposited to the portion (high potential portion) not exposed to the light and therefore not discharged, by which the first color toner image is formed (FIG. 15, (c)). When the latent images are faced to a reverse development type developing device 53, the toner is deposited to the portion (low potential portion) exposed to the light and discharged to 100 V, by which the second color toner image is formed (FIG. 15, (d)). Such a two color toner image is adjusted by the charging device 14 so that the charge polarity is adjusted similarly to the foregoing example, and then is simultaneously transferred onto a transfer material (not shown).

The second example is better than the first conventional example in that the memory for temporarily storing the image data is not necessary. However, it involves a problem with the tone gradation, that is, tone image formation.

Referring to FIG. 16, the problem will be described in comparison with the first conventional example.

In FIG. 16, the ordinate represents the surface potential of the photosensitive drum, and the abscissa represents pixels on the photosensitive drum. In FIG. 16, (c), the tone image formation according to the first conventional example is shown. In this case, the density tone gradation is provided by illumination area by laser beam irradiation period per pixel, and the irradiation period is controlled by a pulse width modulation in accordance with image density signal.

FIG. 16, (d), shows the tone image formation according to the second conventional example through the same method as in FIG. 16, (c). In FIG. 16, (d), the potential remains 1000 V at the portion indicated by M, and therefore, the first color toner is deposited on the portion M. The portion M should not have received the toner, and therefore, the image provided through the second conventional example not proper.

The reason why the potential of the portion M does not decrease to 500 V in the second conventional example will be described.

(1) In the two color image forming apparatus, by switching the exposure amount (Power 1/Power 2) of the latent image forming means, as described hereinafter, the potentials of the latent images corresponding to the colors can be changed, but the switching is carried out in response to color signals (which will be described hereinafter).

The switching of the color signal is carried out in response to the individual pixels, and one of the first color, second color and background, can be selected, so that the two color images can be formed as a whole, as described hereinbefore.

(2) The color signal can not be switched more finely than the pixel unit because of the capacity of the apparatus.

Therefore, when the tone gradation image is to be formed, the pulse width modulation per pixel is carried out to control the illumination period of the laser beam, so that the illumination area is changed to reproduce the tone gradation.

(3) When the first color tone gradation image is formed through this method (FIG. 16, (d)), the output period of Power 1 is controlled, so that the area of white portion is changed in one pixel, so that the tone gradation of the first color image is reproduced.

(4) However, in the case of forming the tone gradation for the second color, even if the area of the second color image is changed in one pixel by controlling the output period of Power 2 light, the portion M not exposed to the laser beam (Power 2 is off), remains 1000 V, and therefore, the first color toner is deposited on the portion M.

In the first conventional example, this problem does not arise because when the photosensitive member is exposed to the light by the first latent image forming means 50, the portion other than the portion to receive the first color toner is all discharged to 500 V, by which the non-image portion level is provided for the portion (pixels) to be exposed by the second latent image forming means 51.

In addition to the method using the pulse width modulation described above, there is a dithering method to provide pseudo-tone-reproduction. In this case, the better tone gradation results in lower resolution because of the number of pixels is reduced, and vice versa.

FIG. 16, (a), shows the surface state of the photosensitive drum when the dithering method is used in the second conventional example. The abscissa represents an exposure pixel, and one image element is provided by four exposure pixels indicated by arrows. By combination of exposures for the four exposure pixels, five grade tone can be represents for one image component. The ordinate represents the surface potential of the photosensitive drum, and patterns in the Figure shows the deposition of the toner. In the Figure, 1-100 means 100% density image component in which all of four exposure pixels are exposed and receive the toner through the regular development; 1-50 represents 50% density image component in which two exposure pixels receive the toner; and 1-25 represents 25% density image component. The image components are for the first color image. In the Figure, 2-50, 2-25, 2-75 represent 50% density image, 25% density image and 75% density image; and 1, 2-0 represent 0% density image (white) for the first and second color images.

FIG. 16, (b) shows another method, in which the exposure amount is continuously changed to provide the tone gradation, however, the image itself becomes instable when a low contrast latent image is developed.

SUMMARY OF THE INVENTION

Accordingly, it is a principal object of the present invention to provide an image forming apparatus and method for forming two color image by a simple structure.

It is another object of the present invention to provide a two color image forming method and apparatus capable of producing halftone images in a two color image formation.

It is a further object of the present invention to provide a two color image forming method and apparatus having a simple structure in which two color images are aligned correctly.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7(a)-7(c) show graphs illustrating advantageous effects of the first embodiment.

FIG. 9 is a longitudinal sectional view of an image forming apparatus according to a third embodiment of the present invention.

DESCRIPTION OF THE PREFERRED EMBODIMENTS

Figure 11:
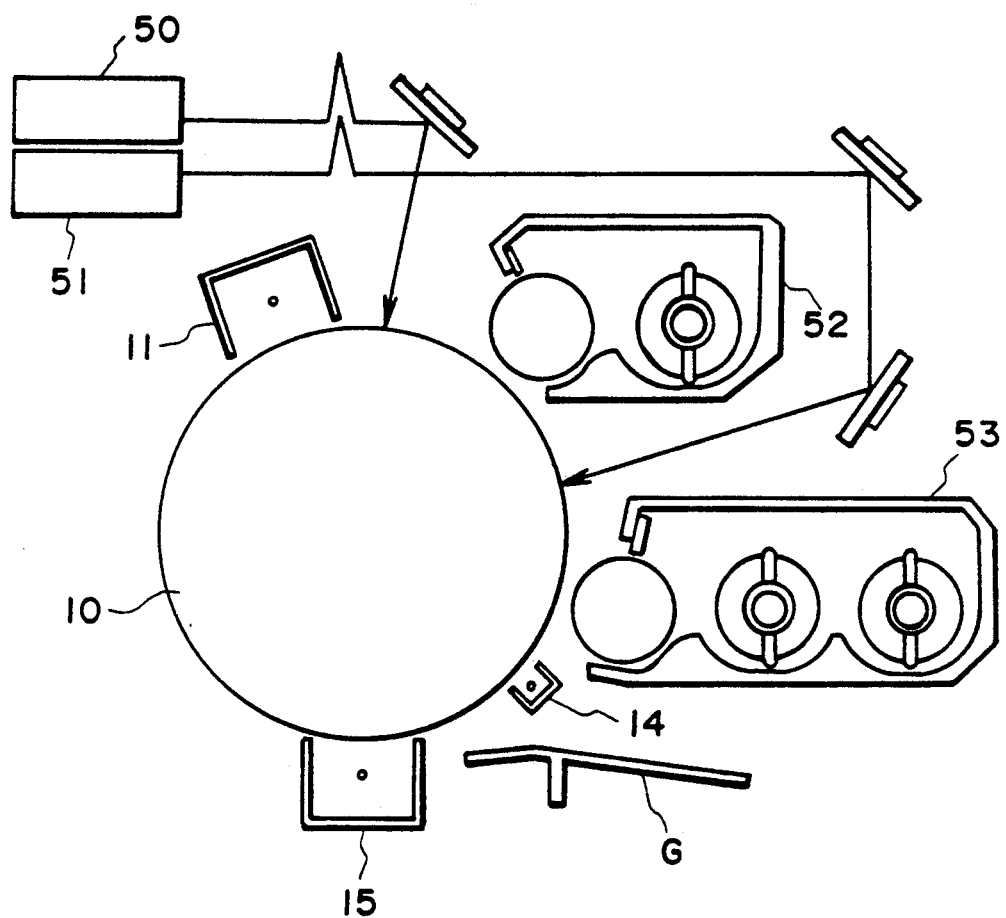
FIG. 11 is a longitudinal sectional view of a first conventional example.

The embodiments of the present invention will be described in conjunction with the accompanying drawings. The same reference numerals as in FIG. 11 have been assigned to the elements having the corresponding functions, and the detailed description thereof are omitted for simplicity.

Figure 1:
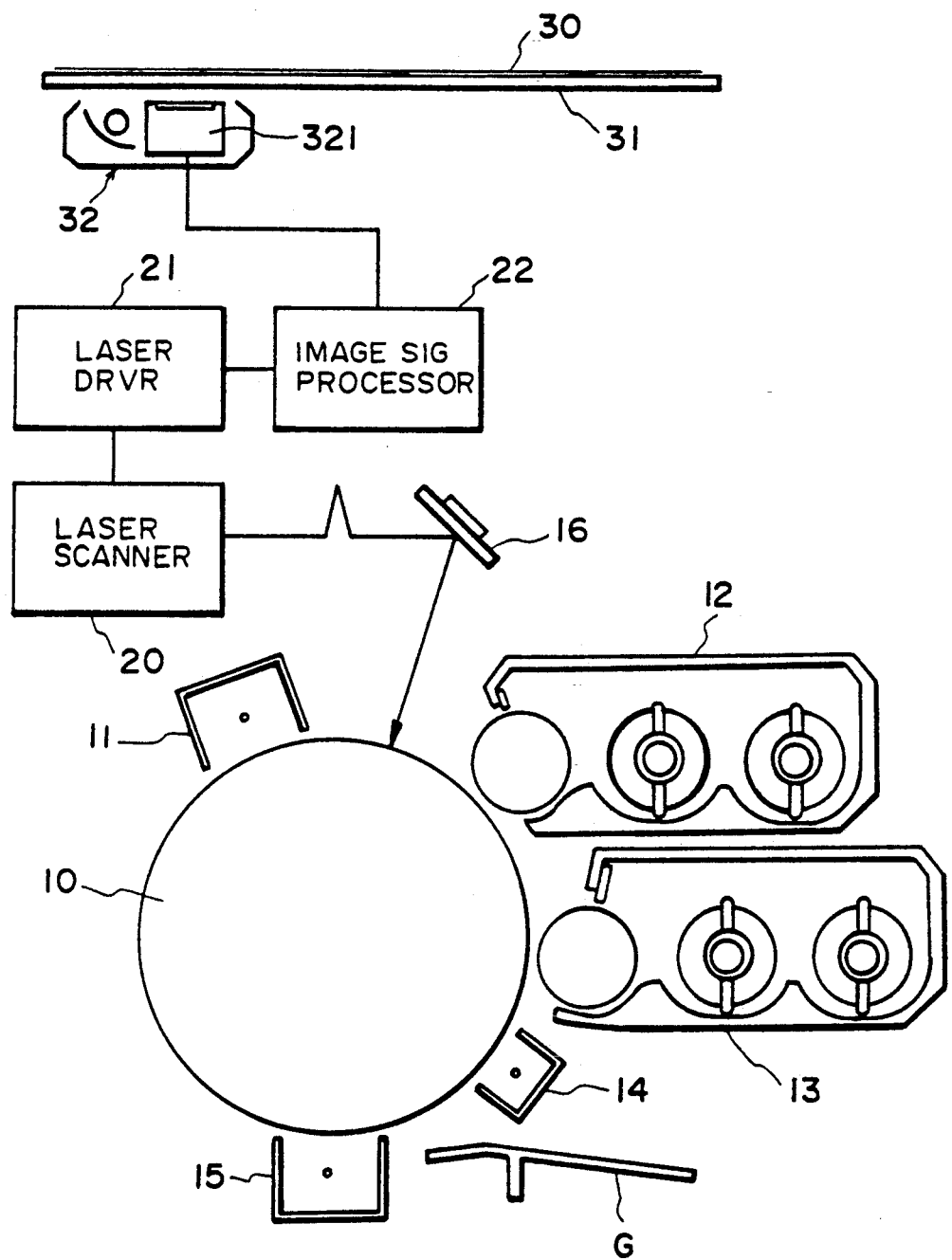
FIG. 1 is a longitudinal sectional view of an image forming apparatus according to a first embodiment of the present invention.

FIG. 1 is a longitudinal sectional view of an image forming apparatus according to an embodiment of the present invention. An original carriage 31 for carrying an original 30 is disposed at an upper portion of the image forming apparatus. Below the original carriage 31, an original reader 32 is disposed to produce an image signal to an image signal processor 22.

The operation of the image signal processor 22 will be described, referring to FIG. 2.

Figure 2:
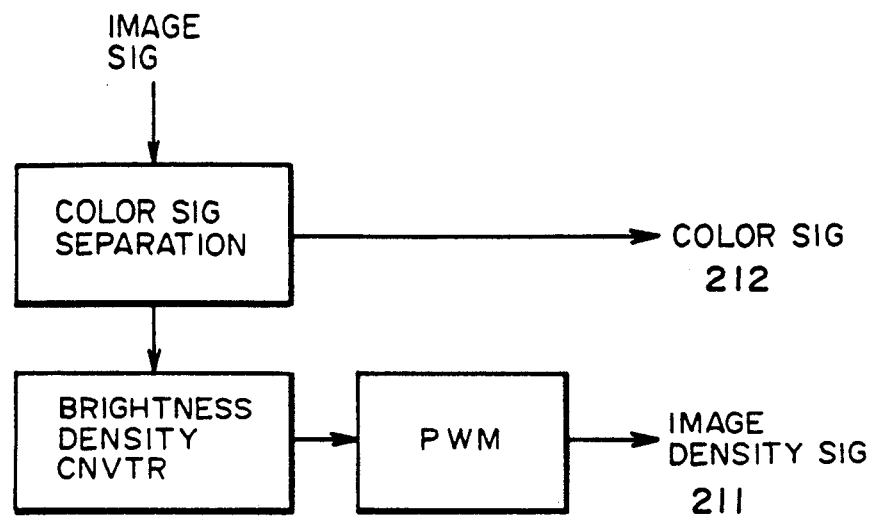
FIG. 2 illustrates a function of an image signal processor.

FIG. 2 is a block diagram illustrating an operation of the image signal processor 22. The image signal supplied from the above-described original reader 32 is separated to color signal 212. The color signal 212 represents black image/color image by Hi-Lo TTL level. Subsequently, the image signal is subjected to brightness image conversion, and is pulse width modulated (PWM), and is converted to an image density signal 211 which is 5 V pulse having a width corresponding to the image density (10 ns–120 ns). The color signal 212 and the image density signal 211 are supplied to a laser driver circuit (control means) 21.

Figure 3:
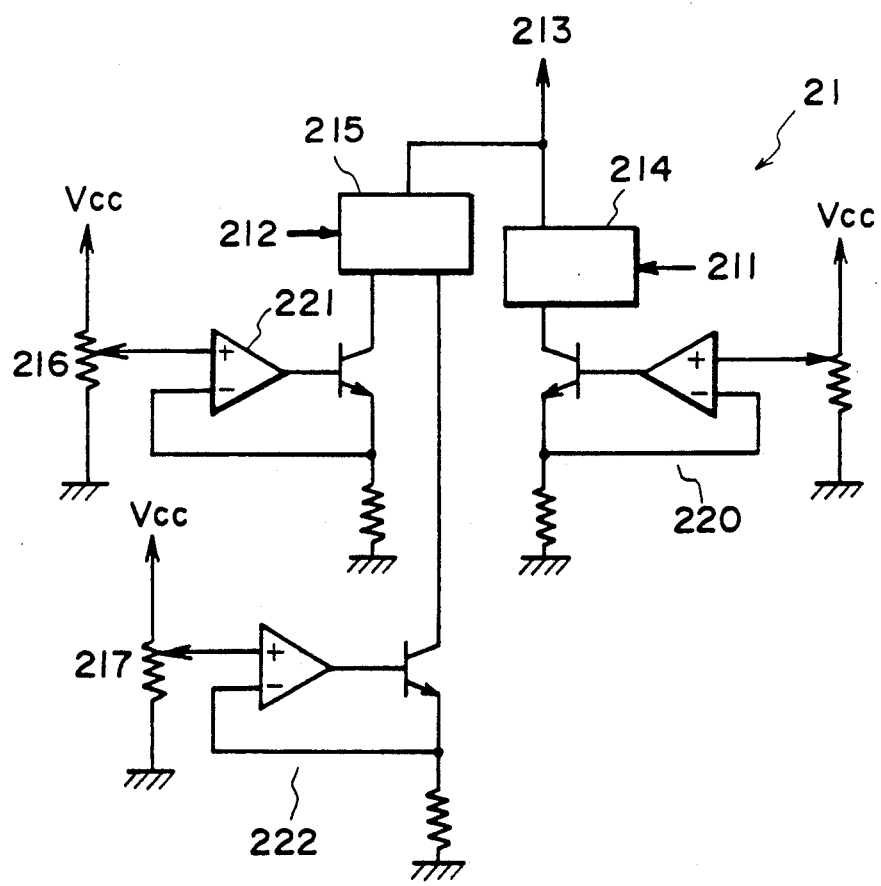
FIG. 3 is a circuit diagram of a laser driver circuit.

Referring to FIG. 3, the laser driver circuit 21 will be described.

FIG. 3 is a circuit diagram of a laser driver circuit 21. When an image density signal 211 is supplied from an image signal processor 22, the image density signal 211 is supplied to a switching device 214 of the laser driver circuit 21. Such a switching device 214 renders on and off at high speed in one pixel the driving current (reference current) in accordance with the pulse width provided by the pulse width modulation in the image signal processor 22, so that the density gradation is reproduced as described hereinbefore. The drive current actuated or deactuated by the switching device 214 is controlled beforehand to be a predetermined current level by a constant current circuit (reference current supply device) 220.

On the other hand, in parallel with a circuit for producing such a driving current, there is a bias current (color current) generating circuit is provided. The switching device 215 in FIG. 3 switches the bias current (black/non-black) for each pixel in response to the color signal 212 supplied from the image signal processor 22. The bias current for each color is provided by constant current circuit (color current supplying device) 221 and 222. The respective current levels are changeable by selectors 216 and 217.

The laser scanner (latent image forming means) 20 is supplied with a current 213 which is a drive current adjusted in accordance with the image density added by the bias current adjusted in accordance with the color signal, so that the exposure is carried out for each pixel at a power level Power 1 or Power 2.

Figure 4:
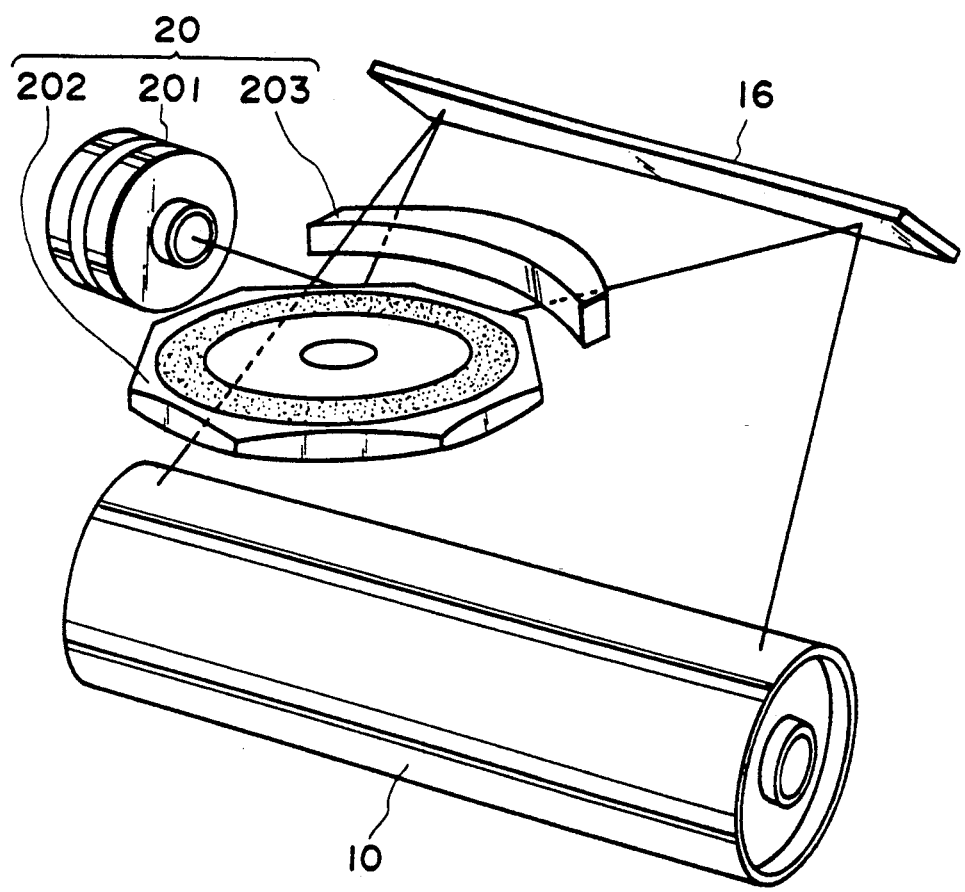
FIG. 4 is a perspective view illustrating a structure of a laser scanner and an laser beam illumination path.

Referring to FIGS. 4 and 5, the structure of the laser scanner 20 or the like will be described. FIG. 4 shows the structure and the laser beam illumination path of the laser scanner 20. FIGS. 5A -5B show a structure of a semiconductor laser unit 201 constituting the laser scanner 20.

Figure 5A:
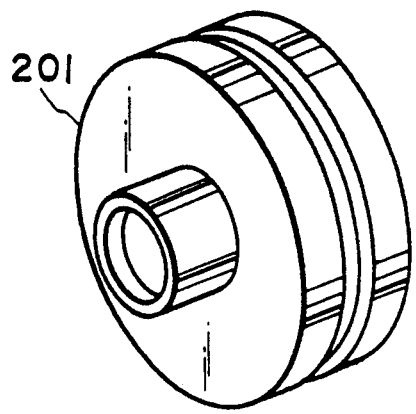
FIGS. 5A, 5B, 5C and 5D illustrate a semiconductor laser unit.
Figure 5B:
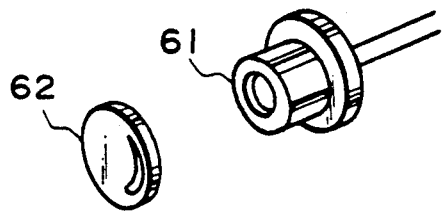
Figure 5C:
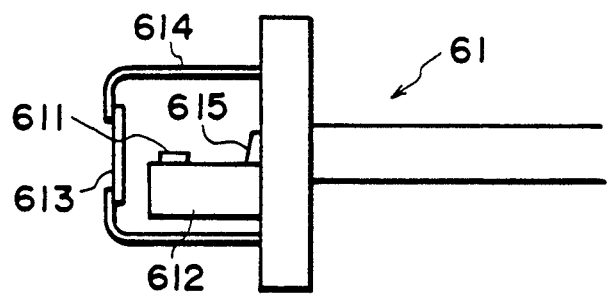
Figure 5D:
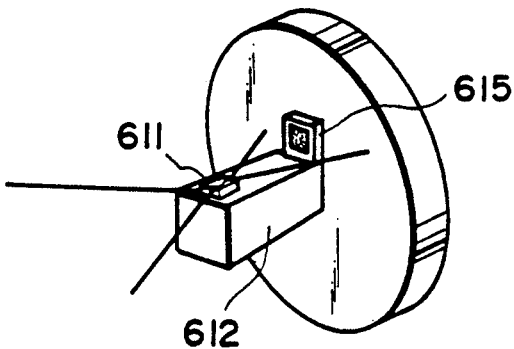

As shown in FIG. 4, the laser scanner 20 comprises a semiconductor laser unit 201, which, in turn, comprises therein a semiconductor laser element (semiconductor laser device) 61 and a collimator lens 62 (FIG. 5B). The semiconductor laser element comprises a semiconductor laser chip 611 to be supplied with the current 213 from the laser driver circuit 21. The semiconductor laser chip 611 is mounted on a stay 612 made of Cu in a case 614. In front of the semiconductor laser chip 611, there is a window 613, and at the rear thereof, a photodiode 615 is disposed. Such a semiconductor laser chip 611 is actuated by the current 213, so that the laser beam is emitted toward the front and rear. The laser beam emitted to the rear is received by the photodiode 615, and the laser beam intensity is monitored thereby. The laser beam emitted to the front is incident on a polygonal mirror 202 through the window 613, as shown in FIG. 4. Such a laser beam is passed through a lens 203, and is reflected by a mirror 16, and finally incident on the photosensitive drum 10. The polygonal mirror 202 rotates at a high-speed, in accordance with which the laser beam is deflected to scan the photosensitive drum 10 to form a light image thereon.

The wavelength of the laser beam is 780 nm. The photosensitive drum 10 comprises an aluminum cylinder of 80 mm diameter and an OPC photosensitive material applied thereon. The developing device 12 contains non-magnetic two component positive toner (black) and functions to visualize a first latent image. The developing device 13 contains non-magnetic two component negative toner to visualize the second latent image. The charging voltage supplied to the charger 14 has a peak-to-peak voltage Vpp of 8.0 KV, frequency F=1 KHz and Vdc=800 V.

Figure 6:
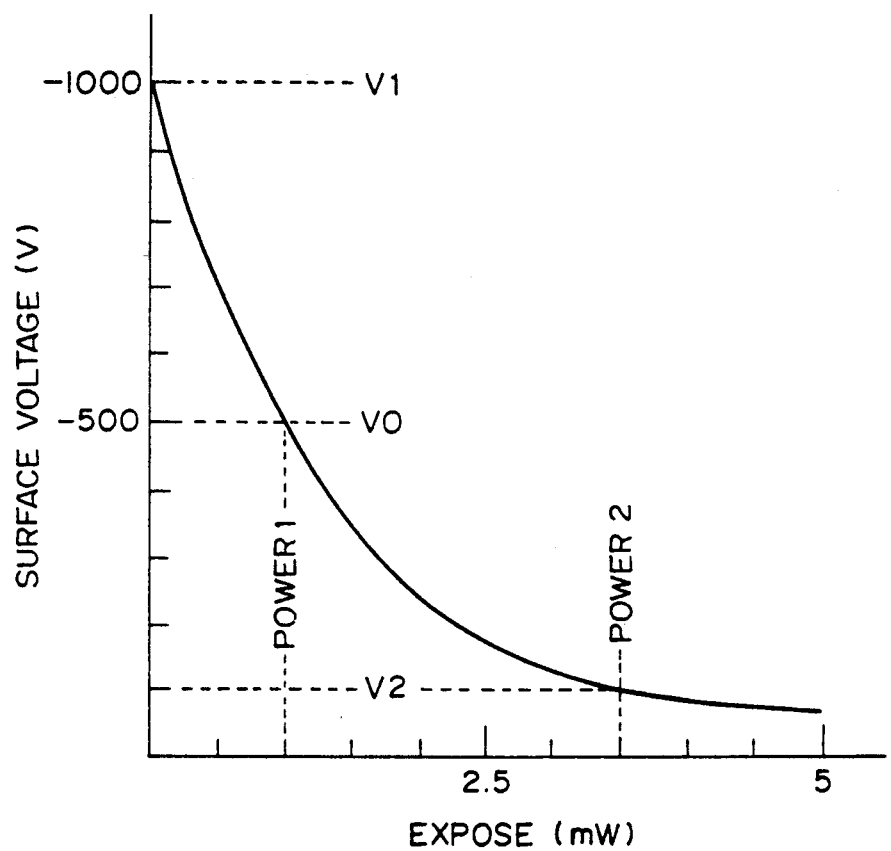
FIG. 6 is a graph of a sensitivity characteristic of the photosensitive drum.

Referring to FIGS. 6 and 7, the image forming operation will be described.

Figure 12:
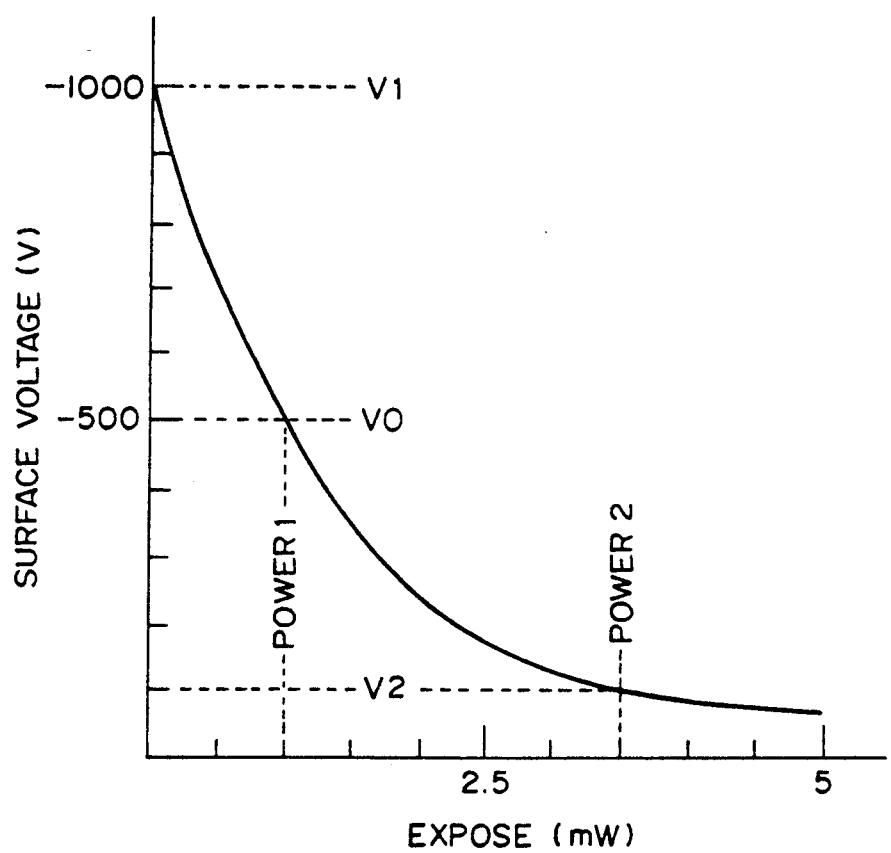
FIG. 12 is a graph of a sensitivity characteristic of a photosensitive drum.
Figure 13A:
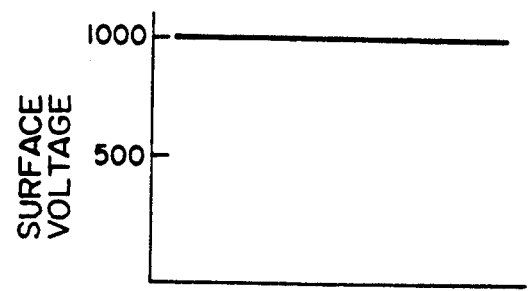
FIGS. 13(a)-13(c) show graphs of the surface state of the photosensitive drum in the first conventional example.
Figure 13B:
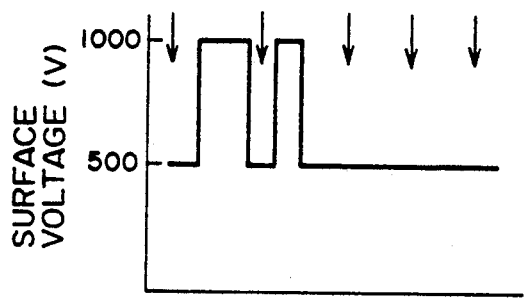
Figure 13C:
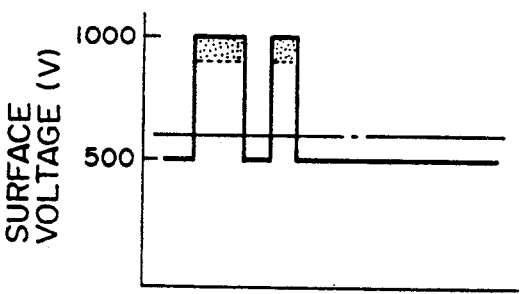
Figure 13D:
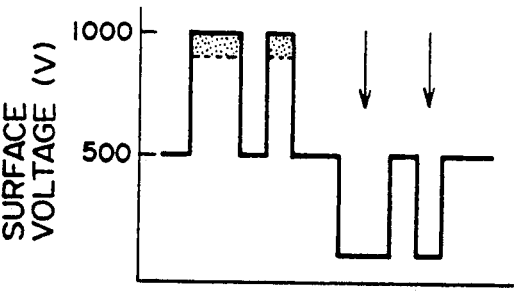
Figure 13E:
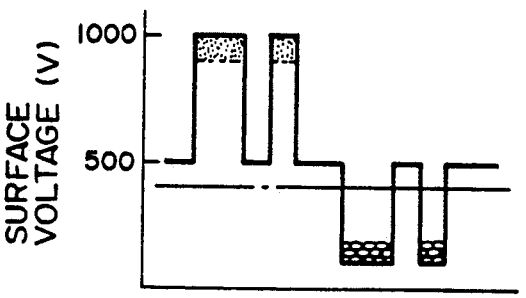
Figure 14:
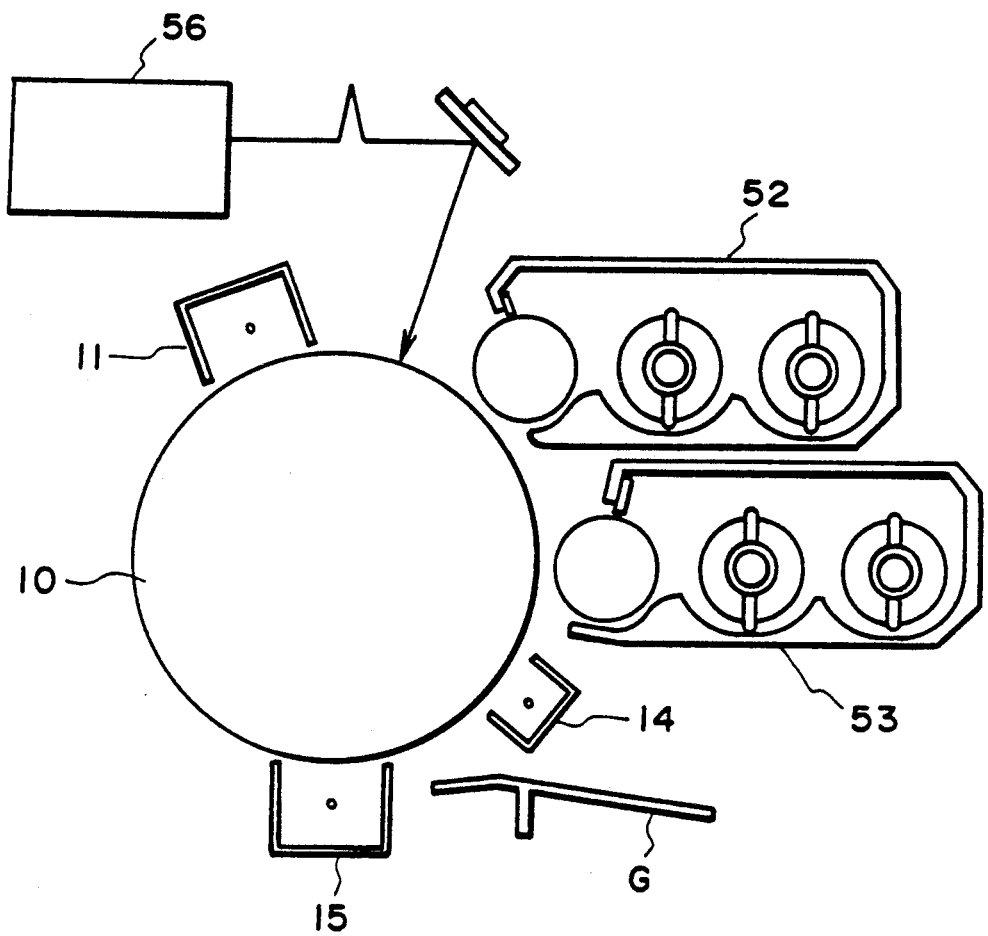
FIG. 14 is a longitudinal sectional view of an image forming apparatus according to a second conventional example.
Figure 15A:
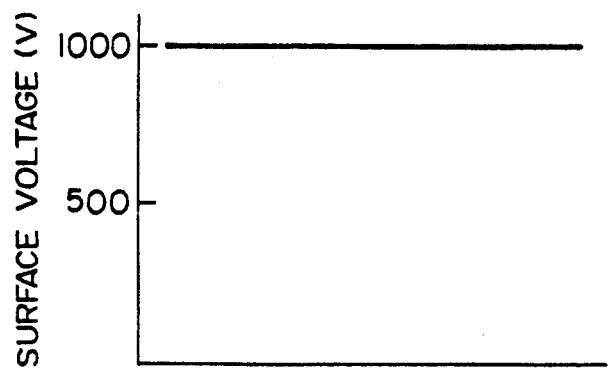
FIGS. 15(a)-15(d) show the surface state of the photosensitive drum in the second conventional example.
Figure 15B:
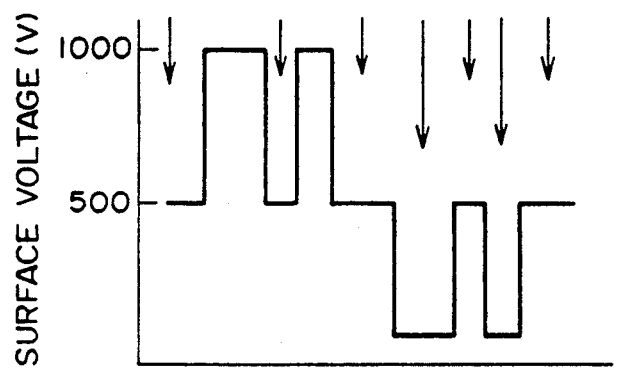
Figure 15C:
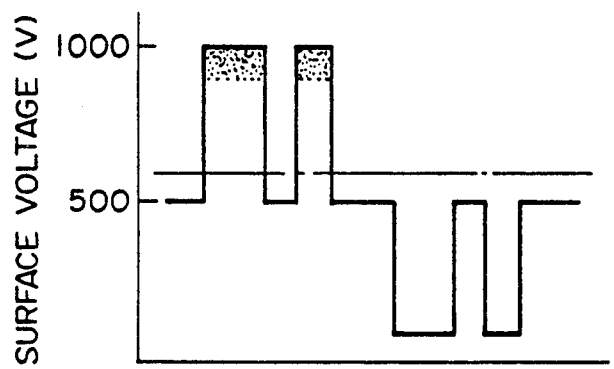
Figure 15D:
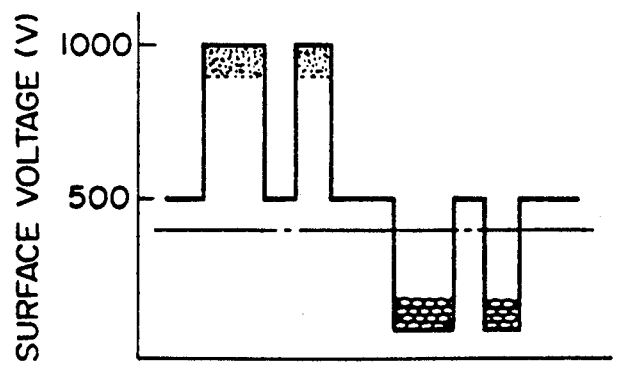
Figure 16A:
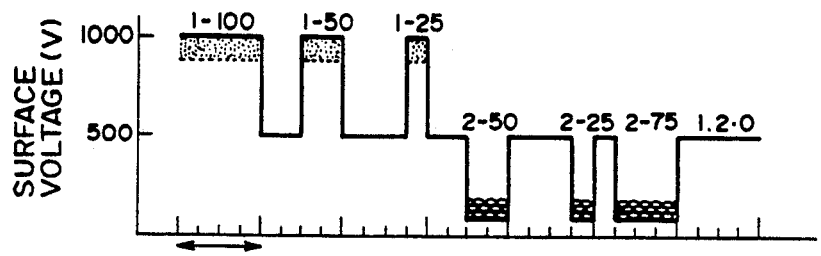
FIGS. 16(a)-16(d) illustrate a problem with a conventional tone gradation image formation.
Figure 16B:
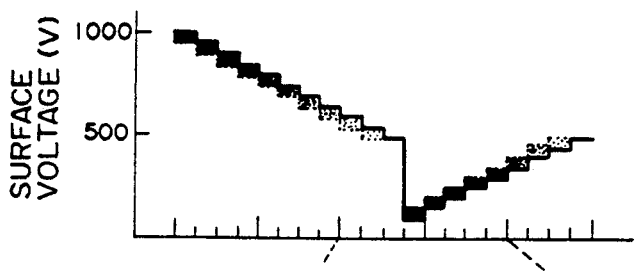
Figure 16C:
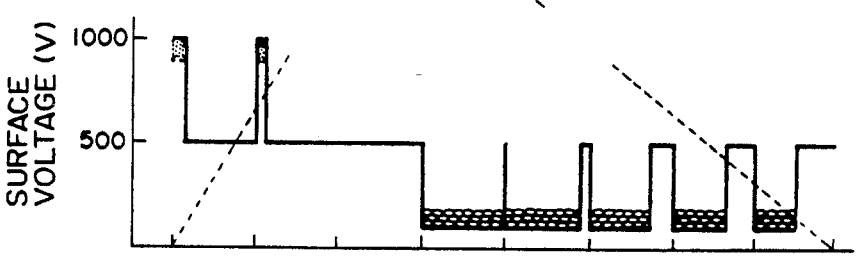
Figure 16D:
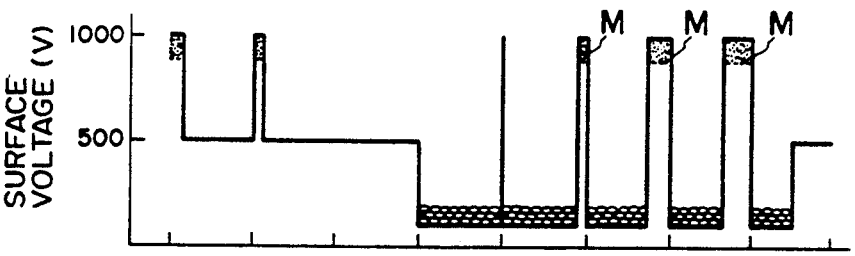

FIG. 6 shows the sensitivity characteristic of the photosensitive drum, similarly to FIG. 12. FIG. 7(a) shows a relationship between an output current 213 of the laser driver circuit 21 and a laser output. FIG. 7(b) shows a photosensitive drum surface potential in a conventional example corresponding to FIG. 16(d). FIG. 7(c), shows a surface potential of the photosensitive drum when the embodiment of this invention is used.

In this embodiment, the surface of the photosensitive drum 10 is charged to −1000 V by the primary charger 11, and the image is projected in the following manner.

For the pixel to form a black image in response to the image density signal 211, the bias current is switched for the black color by the switching device 215, so that the exposure is carried out with power 1 (1 mW) by an output current 213 of the laser driver circuit 21. The period of the exposure is controlled in one pixel in accordance with an image density signal 211, so that the density gradation is expressed. With this case, the bias current flows in the case other than when the exposure is to be carried out by the switching device 214. However, the bias current is sufficiently small, so that the surface of the photosensitive drum is not substantially exposed. The portion to receive the toner is approx. 1000 V, and background portion is 500 V.

In the background pixels, the exposure with Power 1 is carried out throughout one pixel period, and therefore, the exposure period is not controlled, and as a result, the surface potential of the photosensitive drum is maintained at −500 V.

For the pixel of another color, the bias current is switched for the other color by the switching device 215. With the bias current, the exposure is carried out with Power 1 (1 mW) throughout one pixel. When the drive current is applied in accordance with the image density signal 211, the exposure is carried out with Power 2 (3.5 mW) by an output current 213 of the laser driver circuit 21, so that color toner deposition portion is provided.

The output current 213 of the actual laser driver circuit 21 provided 35 mA (bias current of 25 mA and driver current of 10 mA) with Power 1, as shown in FIG. 7(a). With Power 2, it was 45 mA (bias current of 35 mA and drive current of 10 mA).

By doing so, for the pixels of color part are always supplied with the bias current of 35 mA, and therefore the exposure is carried out with the laser output of 1 mW. As shown in detail in FIG. 7(c), the surface potential of the photosensitive drum is maintained at Bias 2, so that the toner is not deposited on the exposed portion. Therefore, the output period with Power 2 is controlled by the switching device 214 so that the area having the surface potential of Bias 3 is controlled to express the tone gradation. Unlike the conventional example (FIG. 7(b)), it does not occur that a portion M remains 1000 V and receives the black toner.

Figure 8:
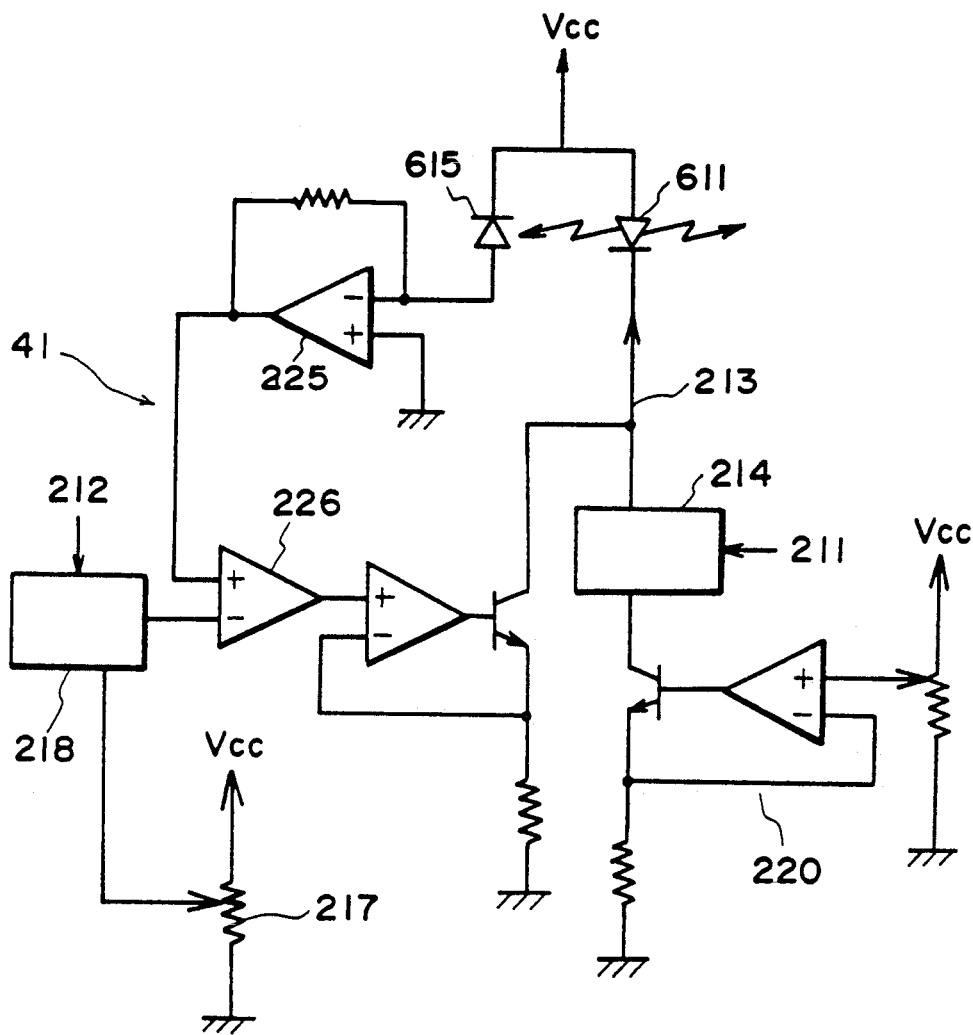
FIG. 8 is a circuit diagram of a laser driver circuit according to a second embodiment of the present invention.

Referring to FIG. 8, another embodiment of the present invention will be described.

The structures of this embodiment is substantially the same as in the foregoing embodiment except for a laser primer circuit 41, a photodiode (detecting means) 615 (FIG. 5), and therefore, the description will be mainly made with respect to the laser driver circuit 41. In this embodiment, the signal from the photodiode 615 shown in FIG. 5 is detected. A circuit 225 functions to receive the signal from the photodiode 615. A circuit 218 functions to maintain the feedback current at a target level in accordance with the color signal 212. The target level can be changed by a selector 17. A feedback circuit (emitted light amount controller) 226 determines a constant in a constant current circuit so that the output current from the circuit 225 (bias light quantity monitor current) is the same as the target level. The bias current is changed through the feedback control to provide the desired light quantity emitted by the semiconductor laser chip 611. A sum of the bias current and the current produced by the constant current circuit 220, that is, the current 213 is supplied to the semiconductor laser chip 611.

By doing so, the quantity of the light emitted by the semiconductor laser chip 611 is constant irrespective of the ambient condition change, and therefore, the density of the image can be properly controls. Similarly to the foregoing embodiment, the toner is not deposited unnecessarily, so that proper tone gradation image can be provided.

Figure 10:
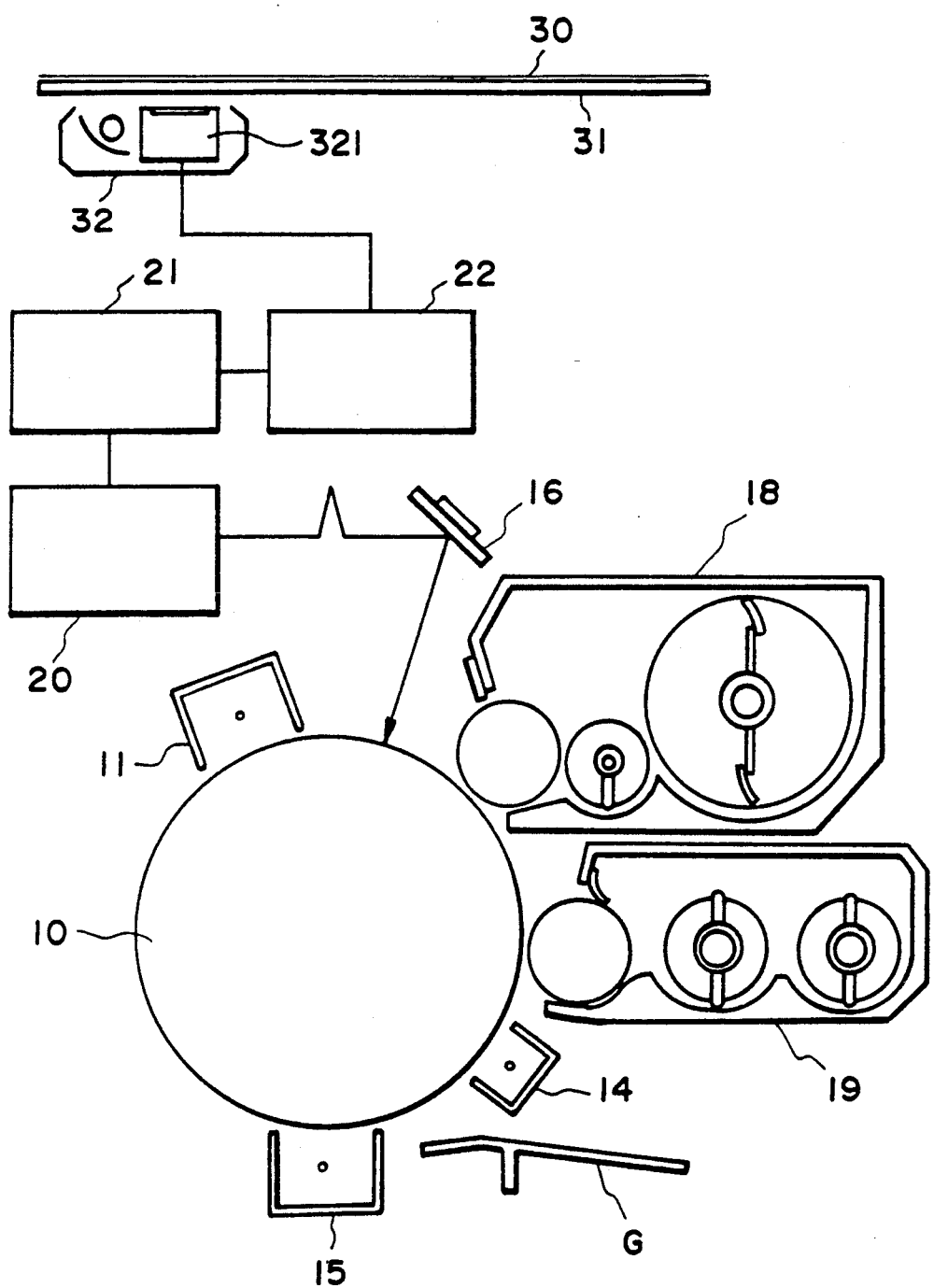
FIG. 10 is a longitudinal sectional view of an image forming apparatus according to a third embodiment of the present invention.

Referring to FIGS. 9 and 10, the description will be made as to a further embodiment.

In FIG. 9, an upstream developing device 12 with respect to the rotational direction of the photosensitive drum, is of a contact type using non-magnetic two component developer, and is used for reverse-developing the second latent image. A downstream developing device 17 is of non-contact type using magnetic one component developer and is used for regularly developing the first latent image. The other structures are the same as in the foregoing embodiments.

Similarly to the foregoing embodiments, proper gradation images can be provided. Since the downstream developing device is of non-contact type, the toner image already formed on the photosensitive drum is not disturbed by the downstream developing device.

Furthermore, non-magnetic one component developing device can be used which is not necessary to use a toner image control means, toner supplying means, stirring means or the like, and therefore, the structure is simple.

The magnetic one component developing device performs a regular development, and therefore, the reduction of the toner deposition force as in the reverse development is not a problem.

However, there is a liability that the toner of the upstream developing device is mixed into the downstream developing device. The result of the mixture is such that the image quality is more degraded when the color toner is mixed into the black toner in FIG. 10, the magnetic one component developing device is used at the upstream as a regular development first developing device, and a non-magnetic one component developing device is used downstream as a reverse developing device.

By doing so, the image is free of influence of the color mixture and image disturbance.

As described in the foregoing, according to the present invention, even if the density gradation is reproduced by controlling the time period in which a reference current is outputted, the image color when the reference current is off can be made white by controlling the current for each of the colors. Therefore, the tone image is not disturbed by deposition of unnecessary toner.

In addition, the device for supplying electric current for each of the colors can change the current for individual pixels, and therefore, the tone reproduction can be provided for each pixel. In other words, unlike the pseudo tone reproduction as in dithering method, a plurality of pixels are not required for the tone reproduction. Therefore, it is not necessary to improve the tone reproduction at the cost of the resolution.

Since only one latent image forming means is used, the space around the image bearing member is not reduced, or the control system becomes complicated, but still the good tone gradation image can be provided.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus comprising:
   an electrophotographic photosensitive member;
   charging means for electrically charging said photosensitive member;
   one information light source for emitting light information to said photosensitive member, said light source being actuatable by electric power supply;
   light quantity control means for controlling said light source to produce a controlled quantity of light from said light source in accordance with image information;
   developing means for developing an electrostatic latent image formed on said photosensitive member, said developing means comprises first developing means for developing it with first toner, and second developing means for developing it with second toner having a color different from that of the first toner;
   wherein said control means comprises a reference current source for supplying a predetermined reference current, and a color current source for supplying currents predetermined for respective colors, and wherein in exposure for a pixel, said light source is supplied with a current which is a sum of a current from the reference current source and a current from the color current source, so that an electrostatic latent image having different potentials in accordance with colors of the image information is formed by a single image information exposure step.

2. An apparatus according to claim 1, wherein said information source is in the form of a semiconductor laser source.

3. An apparatus according to claim 1, wherein said control means comprises a switching circuit for defining time period in which the reference current is outputted.

4. An apparatus according to claim 1, further comprising detecting circuit for detecting light emitted by said light source and light quantity control circuit for controlling the color current in accordance with an output of said detecting circuit to provide a target light quantity from the light source.

5. An apparatus according to claim 1, wherein one of said first and second developing means is a regular development type device, and the other is a reverse development type.

6. An apparatus according to claim 5, wherein the electrostatic latent image is developed by the reverse development type device, and thereafter, is developed by the regular development device.

* * * * *

UNITED STATES PATENT AND TRADEMARK OFFICE
CERTIFICATE OF CORRECTION

PATENT NO. : 5,305,069
DATED : April 19, 1994
INVENTOR(S) : Masao Nakano

It is certified that error appears in the above-identified patent and that said Letters Patent is hereby corrected as shown below:

Column 1, line 66, change "deem" to --beam--.

Column 2, line 20, change "source 53" to --source 50--;
line 32, change "for" to --not--; and
line 44, change "receive" to --receives--.

Column 3, line 43, change "image is are" to --image is--.

Column 4, line 15, change "not" to --is not--; and
line 63, delete the first occurrence of "of".

Column 5, line 2, change "tone" to --tones-- and "represents" to --represented--; and
line 49, change "an" to --a--.

Column 6, line 58, delete "there is".

Column 7, line 15, change "element" to --element 61--;
line 31, change "high-speed," to --high speed,--; and
line 61, change "power 1" to --Power 1--.

Column 8, line 37, change "structures" to --structure--; and
line 61, change "controls." to --controlled.--.

UNITED STATES PATENT AND TRADEMARK OFFICE
CERTIFICATE OF CORRECTION

PATENT NO. : 5,305,069
DATED : April 19, 1994
INVENTOR(S) : Masao Nakano

It is certified that error appears in the above-identified patent and that said Letters Patent is hereby corrected as shown below:

Column 10, line 40, change "time" to --a time--.

Signed and Sealed this

Twenty-second Day of November, 1994

Attest:

BRUCE LEHMAN

*Attesting Officer*   *Commissioner of Patents and Trademarks*